United States Patent [19]

Royce et al.

[11] 4,021,588

[45] May 3, 1977

[54] METHOD FOR PREPARING FILTER-COATED PHOSPHOR PARTICLES

[75] Inventors: Martin Robert Royce, Lancaster; Robert Paul Thompson, Millersville, both of Pa.

[73] Assignee: RCA Corporation, New York, N.Y.

[22] Filed: Jan. 23, 1976

[21] Appl. No.: 651,919

[52] U.S. Cl. .............................. 427/215; 313/466; 428/403

[51] Int. Cl.² ...................................... B23K 31/02

[58] Field of Search .................. 313/466, 472; 427/215–218; 428/403

[56] References Cited

UNITED STATES PATENTS

| | | | |
|---|---|---|---|
| 2,684,306 | 7/1954 | Brewer | 427/73 |
| 2,774,682 | 12/1956 | Larach | 313/466 |
| 2,971,859 | 2/1961 | Sisneros | 427/215 |
| 3,264,133 | 8/1966 | Brooks | 427/215 |
| 3,690,929 | 9/1972 | Yokota et al. | 427/215 |
| 3,875,449 | 4/1975 | Byler | 313/466 |
| 3,927,240 | 12/1975 | Hammond et al. | 427/215 |

FOREIGN PATENTS OR APPLICATIONS 1,168,074  10/1969  United Kingdom ............ 427/215

*Primary Examiner*—Ronald H. Smith
*Assistant Examiner*—S. Silverberg
*Attorney, Agent, or Firm*—G. H. Bruestle; L. Greenspan

[57] ABSTRACT

Method comprises dispersing phosphor particles in a liquid medium and then precipitating filter material on the phosphor particles. The filter-covered phosphor particles are removed from the medium, dried and then heated until the filter material sinters to the surfaces of the phosphor particles as discrete filter particles.

10 Claims, No Drawings

METHOD FOR PREPARING FILTER-COATED PHOSPHOR PARTICLES

BACKGROUND OF THE INVENTION

This invention relates to a novel method for preparing filter-coated phosphor particles.

Filter-coated phosphor particles and their use in viewing screens for cathode-ray tubes have been described previously; for example, in U.S. Pat. Nos. 3,308,326 to S. H. Kaplan, 3,875,449 to W. H. Byler et al and 3,886,394 to S. A. Lipp. As disclosed in these patents, filter material may completely cover the phosphor surfaces, or may only partially cover the surfaces of the phosphor particles. In the methods described in these patents, the filter material is prepared separately and then particles thereof are deposited on the surfaces of the phosphor particles.

SUMMARY OF THE INVENTION

The novel method for coating phosphor particles with discrete filter particles comprises (a) dispersing the phosphor particles in a liquid medium, (b) precipitating filter material on the dispersed phosphor particles, and preferably only sufficient filter material to partially cover the surfaces of the phosphor particles, (c) removing the coated phosphor particles from the liquid medium and (d) then heating the coated phosphor particles until the filter material sinters to the surfaces of the phosphor particles as discrete filter particles.

Unlike previous processes, the step of precipitation synthesizes the filter material in situ. The subsequent heating step develops in the filter material the desired crystallinity, filter particle size and adherence to the phosphor particle.

DETAILED DESCRIPTION OF THE PREFERRED EMBODIMENTS

EXAMPLE 1

Suspend about 250 grams of red-emitting yttrium europium oxysulfide (average particle size about 8 to 10 microns) in about 2,500 ml. of deionized water. Mix about 9.3 ml. of aqueous cadmium sulfate solution (containing about 0.2697 grams $Cd^{++}$/ml.) into the phosphor suspension. With slow stirring, adjust the pH of the suspension to about 2.5 (range is 0.5 to 6.0) with acid such as sulfuric acid. Then, add dropwise with stirring about 179 ml. of an aqueous sodium sulfoselenide $Na_2[S_{0.5}Se_{0.5}]$ solution (containing about 0.00494 gram $Se^{--}$/ml.). Digest the mixture with stirring for at least one hour to permit substantially all of the cadmium present to precipitate as particles of cadmium sulfo-selenide on the phosphor particles. Then allow the solids to settle, decant the supernatant liquid, wash the settled solids with deionized water and dry the solids at about 125° C. Place the dry solids in a quartz beaker and then heat the beaker and contents within a carbon container for about 90 minutes at about 800° C, which produces a mildly reducing ambient. Then cool the beaker and contents to room temperature. Scanning electron micrographs showed the product to be small filter particles (estimated average size about 0.05 to 1.0 micron) more or less evenly distributed over and sintered to the surfaces of phosphor particles. The pigment particles covered (by estimation) less than about 10 percent of the phosphor surfaces and constituted (by calculation) about 1.5 weight percent of the product.

EXAMPLE 2

Suspend about 250 grams of red-emitting yttrium europium oxysulfide (average particle size about 8 to 10 microns) in about 2,500 ml. of deionized water. Mix about 10.85 ml. aqueous cadmium sulfate solution (containing about 0.2697 gram $Cd^{++}$/ml.) into the phosphor suspension. With slow stirring, adjust the pH of the suspension to about 3.0 with acid, such as sulfuric acid. Then, add dropwise with stirring about 13.04 ml. aqueous sodium sulfide solution (containing about 0.032 gram $S^{--}$/ml.) and about 46.7 ml. aqueous sodium selenate solution (containing 0.022 gram $Se^{--}$/ml.). Digest the mixture with stirring for at least one hour. Then settle, decant, wash, dry, heat at about 800° C and cool as in Example 1. Scanning electron micrographs showed the product to be small filter particles (estimated particle size about 0.1 to 1.0 micron) more or less evenly distributed over and sintered to the surfaces of phosphor particles. The filter particles covered (by estimation) less than about 10 percent of the phosphor surfaces and constituted (by calculation) about 1.7 weight percent of the product.

GENERAL CONSIDERATIONS

The novel method differs from prior methods (1) by precipitating the filter material directly on the surfaces of the phosphor particles while suspended in a liquid medium and (2) by heating the coated phosphor particles to develop the desired particle size and crystallinity in the filter material in situ.

The phosphor particles are fully formed at the outset of the novel method. They are generally about 5 to 20 microns average particle size, and preferably 6 to 12 microns. They are about the size that would normally be used for producing viewing screens for cathode-ray tubes by known processes. Any of the known phosphors which are substantially insoluble in the suspending liquid may be used.

The suspending liquid is a matter of choice although water is preferred in view of its low cost, high safety and known technology. Other polar liquids may be used. Water in combination with other liquids such as alcohols may be used. Suspending the phosphor particles in the liquid may be achieved by any of the known techniques. The preferred technique is to mix the phosphor into the liquid and then to apply one of the more energetic methods for dispersing the phosphor particles.

The filter material may be of any chemical composition which selectively reflects and/or transmits light in a portion of the spectrum, and which can be precipitated in the suspending liquid. The filter material is referred to as being a red (or blue) filter material if it appears in daylight to be visually red (or blue) to the naked eye, and so forth. The preferred filter materials for practicing the novel method are chalcogenides (sulfides, selenides and/or tellurides) of one or more bivalent cations (cadmium, zinc, calcium, magnesium, strontium, and/or barium). The preferred pigment is cadmium sulfo-selenide wherein the molar proportion of sulfide to sulfide plus selenide is in the range of 0.3 to 0.7. These are red pigments. In preferred embodiments, the weight ratio of cadmium sulfo-selenide pigment particles to phosphor particles is in the range of 0.001 to 0.05 which usually results in only partial coverage of the phosphor particles. Generally, the higher the weight ratio of pigment to phosphor and the smaller the filter particle sizes, the greater will be the amount of phosphor surface covered.

After the phosphor particles are suspended in the liquid medium, soluble compounds containing cations and anions that will constitute the pigment are introduced into the suspension. The amount of cation introduced generally limits the amount of filter material that can be precipitated. The pH and conditions of the suspension are adjusted to optimize the precipitation. The suspension is stirred and permitted to digest to complete the precipitation. It is at this stage that the composition of the pigment material is determined.

For the preferred filter material, cadmium, sulfide and selenide ions are brought together in an aqueous suspension of a red-emitting phosphor. The phosphor particles serve as nucleating centers for precipitating cadmium sulfo-selenide. The cadmium can be introduced as any soluble cadmium compound such as the nitrate, the sulfate, the acetate, etc. of cadmium. The sulfide and selenide can be introduced as water-soluble compounds such as sodium sulfide, sodium selenate, sodium sulfoselenate, sodium polysulfoselenide, etc. The sulfide and selenide are preferably introduced in such amounts that substantially all of the cadmium present is precipitated.

When $Cd^{+2}$, $S^{-2}$ and $Se^{-2}$ ions are brought together as described herein, insoluble cadmium sulfo-selenide filter material precipitates on the phosphor particles. This can be accounted for with the following reactions which are believed to occur in the examples:

$$Cd^{+2} + Na_2SSeO_3 + Na_2S \rightarrow CdSSe + 2Na^{+1} + \ldots$$

$$Cd^{+2} + Na_2(SSe)_x \rightarrow CdSSe + 2Na^{+1} + \ldots$$

When these or similar reactions take place in the presence of red-emitting phosphor particles, the phosphor particles provide nucleation sites on which the filter material precipitates. This is evidenced by the observation that the 8-to-10-micron phosphor particles and the submicron filter material settle together in the liquid medium with no evidence of separation, layering or differential settling.

After precipitation, the filter-coated phosphor particles are separated from the liquid medium, as by settling and decantation, although other methods may be used. The coated phosphor particles are washed and dried, during which steps any loose material is removed. Nevertheless, at this stage the filter material is incompletely crystallized and is only partially adhered to the phosphor particles.

The step of heating or firing the coated phosphor particles at elevated temperatures in a nonoxidizing atmosphere serves to further develop crystallinity and particle size in the filter material as well as to sinter the filter particles to the phosphor particle surfaces. The ambient around the phosphor during heating may be neutral or reducing. The heating may be conducted for about 30 to 120 minutes at about 600° to 900° C. After heating, the filter particles may completely cover the phosphor surfaces but, preferably, the filter particles only partially cover the surfaces of the phosphor particles.

Phosphors coated according to the method described herein exhibit a higher light output than similar phosphors coated with preformed filter particles. Color picture tubes made with the precipitated filter-coated red-emitting phosphor described herein show good light output at 25 kv when compared with similar tubes made with red-emitting phosphor particles coated with preformed filter particles. In one test, the tube performance compared as follows:

| Red Emitter With | Fl/ma | Red L/W |
|---|---|---|
| Preformed Filter | 84.0 | 20.4 |
| Precipitated Filter | 88.1 | 20.2 |

In the comparison, Fl/ma (white tube brightness) is foot lamberts of white light output at a correlated color temperature of 9,300° Kelvin per milliampere of total electron beam currents, and red L/W (red phosphor efficiency) is lumens output per watt input. An advantage to the filter coated red phosphor made according to the invention is the stability of the material to withstand standard salvage procedures. For example, x-ray fluorescence data confirms no change in selenium levels when salvaged red-emitting phosphor (after slurry deposition) is treated with hydrochloric acid to a pH below 1.0. This is extremely desirable since reconstitution of the red-emitting phosphor is not required before subsequent reusage of salvaged phosphor.

We claim:
1. A method for coating phosphor particles with discrete filter particles comprising
   a. suspending said phosphor particles in a liquid medium,
   b. precipitating on said phosphor particles only sufficient filter material to cover surfaces of said phosphor particles, said filter material being a chalcogenide selected from the group consisting of sulfides, selenides and/or tellurides of at least one bivalent cation selected from the group consisting of cadmium, zinc, calcium magnesium, strontium and/or barium,
   c. removing said covered phosphor particles from said liquid medium
   d. and then heating said covered phosphor particles in a nonoxidizing ambient until said filter material sinters to the surfaces of said phosphor particles as discrete filter particles.
2. The method defined in claim 1 wherein said filter material is a cadmium sulfo-selenide.
3. The method defined in claim 2 wherein said precipitated filter material only partially covers the surfaces of said phosphor particles.
4. The method defined in claim 2 wherein the weight ratio of filter particles to phosphor particles is in the range of 0.001 to 0.05.
5. The method defined in claim 1 wherein said filter material is a chalcogenide of at least one of zinc, cadmium, calcium, strontium, magnesium and barium.
6. A method for coating phosphor particles with discrete filter particles comprising
   a. dispersing phosphor particles in an aqueous medium,
   b. mixing into said medium cadmium ions in water-soluble form,
   c. then mixing into said medium sulfide and selenide ions in water-soluble form in quantities at least sufficient to react with substantially all of cadmium ions present in said medium, whereby cadmium sulfo-selenide precipitates on the surfaces of said phosphor particles, d. then removing from said medium and drying phosphor particles carrying said precipitated material, d. and heating said dry phosphor particles in a nonoxidizing atmosphere until said precipitated material forms discrete, crystalline particles which are sintered to the surfaces of said phosphor particles.

7. The method defined in claim 6 wherein in step (c) the mole ratio of sulfide ions to sulfide plus selenide ions is in the range of 0.3 to 0.7.

8. The method defined in claim 6 wherein in step (c) said sulfide ions and selenide ions are present in substantially equimolar proportions.

9. The method defined in claim 6 wherein in step (e), said phosphor particles are heated at about 600° to 900° C for about 30 to 120 minutes.

10. The method defined in claim 6 wherein in step (e) said phosphor particles are heated in a mildly reducing ambient at about 800° C for about 90 minutes.

* * * * *